United States Patent [19]

Wahl et al.

[11] Patent Number: 5,324,353
[45] Date of Patent: Jun. 28, 1994

[54] ZINC SULFIDE BODIES HAVING IMPROVED OPTICAL TRANSMITTANCE CHARACTERISTICS AND MECHANICAL CHARACTERISTICS

[75] Inventors: Joseph M. Wahl, Shirley; Randal W. Tustison, Lexington; Thomas Y. Wong, Needham, all of Mass.

[73] Assignee: Raytheon Company, Lexington, Mass.

[21] Appl. No.: 985,531

[22] Filed: Dec. 3, 1992

Related U.S. Application Data

[63] Continuation of Ser. No. 809,210, Dec. 16, 1992, abandoned, which is a continuation of Ser. No. 614,186, Nov. 14, 1990, abandoned.

[51] Int. Cl.$^5$ .................. C09D 1/00; C09D 5/38; C01G 9/08
[52] U.S. Cl. .................. 106/286.3; 106/286.6; 423/275; 423/566.1; 427/161
[58] Field of Search .................. 106/286.3; 423/275, 423/566.1; 427/161

[56] References Cited

U.S. PATENT DOCUMENTS

| | | | |
|---|---|---|---|
| 3,131,026 | 4/1964 | Carnall, Jr. et al. | 423/566.1 |
| 3,131,238 | 4/1964 | Carnall, Jr. et al. | 264/1.2 |
| 3,841,739 | 10/1974 | Asahara et al. | 350/320 |
| 4,366,141 | 12/1982 | Martin et al. | 423/566.1 |
| 4,772,080 | 9/1988 | Tustison | 427/162 |
| 4,778,731 | 10/1988 | Kraatz et al. | 428/623 |
| 4,826,266 | 5/1989 | Baird et al. | 350/1.1 |
| 4,889,746 | 12/1989 | Utsumi et al. | 427/162 |
| 4,944,900 | 7/1990 | Willingham et al. | 264/1.2 |
| 5,067,781 | 11/1991 | Montanari et al. | 427/160 |

FOREIGN PATENT DOCUMENTS

| | | | |
|---|---|---|---|
| 59-164632 | 9/1984 | Japan | 423/566.1 |
| 2090237 | 7/1982 | United Kingdom | 423/566.1 |
| 2156383A | 2/1984 | United Kingdom | C23C 14/48 |

OTHER PUBLICATIONS

Hawley, *Condensed Chemical Dictionary*, Van Nostrand Reinhold Co. NY, 1974, p. 222 (no month avail).

Uematsu, Keizo, Kazuhiko Sawada, Zenji Kato, Nozomu Uchida, and Katsuichi Saito, "Effect of Additives on the Hot Pressing of Zinc Sulphide," (1988) May, No. 5, Journal of Materials Science Letters, pp. 473-474.

Sokolov, V. I., A. N., Mamedov, T. P. Surkova, M. V. Chukichev, and M. P. Kulakov, "Energy States of Cobalt in Zinc Selenide and Zinc Sulphide," Opt. Spectrosc. (USSR) 62 (4), Apr. 1987, pp. 480-484.

*Primary Examiner*—David Brunsman
*Attorney, Agent, or Firm*—Richard M. Sharkansky

[57] ABSTRACT

A method for increasing the optical transmission characteristics of zinc sulfide in the visible and infrared portions of electromagnetic spectrum is described. Materials such as metals and, in particular, transition metals are diffused through the zinc sulfide material over a duration of time sufficient to cause the material to turn substantially water clear and substantially colorless.

13 Claims, 2 Drawing Sheets

ZINC SULFIDE BODIES HAVING IMPROVED OPTICAL TRANSMITTANCE CHARACTERISTICS AND MECHANICAL CHARACTERISTICS

This application is a continuation of application Ser. No. 809,210, filed Dec. 16, 1992, now abandoned, which is a continuation of application Ser. No. 614,186 filed Nov. 14, 1990, now abandoned.

BACKGROUND OF THE INVENTION

This invention relates generally to optical elements and more particularly to infrared optical elements having enhanced transparency in the visible, as well as, the infrared spectrums.

As it is known in the art, optical imaging systems generally include one or more externally mounted optical elements which isolate the remainder of the imaging system from an external environment. It is also known in the art that certain applications of these optical elements are on dual mode systems which require transparency in both the infrared as well as the visible portions of the electromagnetic spectrum.

When the portions of the electromagnetic spectrum include long wavelength infrared energy (LWIR) particularly in the 8-12 micron band, the number of materials which also provide suitable transparency in the visible portion of the spectrum are limited. Materials which have theoretical transparency in the infrared 8-12$\mu$ and the visible are generally alkaline-earth halides, wide bandgap semiconductor materials and diamond. One such material, in particular, is zinc sulfide. As deposited or grown fully dense, polycrystalline ZnS is orange in color having very little transmittance in the visible due to scattering effects. It is known that this orange, optical grade chemically vapor deposited zinc sulfide, which is transparent over the range of about 0.5$\mu$ to 12$\mu$, when subjected to a hot isostatic treatment, that is a treatment at an elevated pressure and an elevated temperature, causes the zinc sulfide to become transparent in the visible portion of the electromagnetic spectrum, as well as, the infrared portions of the electromagnetic spectrum.

This treatment, however, has one drawback. The HIPping of the zinc sulfide material causes grain growth in the material. An increase in the grain size of the zinc sulfide provides a concomitant reduction in the mechanical strength properties of the material. That is, although HIPping increases the optical performance of the material, HIPping also reduces the strength of the material. Although such treated zinc sulfide material is suitable for many applications, it would nevertheless be desirable to provide zinc sulfide material which is transparent in both the visible and infrared spectrums while still retaining relatively high mechanical strength properties. Moreover, it would also be desirable to provide other materials having improved optical transparency in the visible and infrared.

SUMMARY OF THE INVENTION

In accordance with the present invention, a method of improving the optical properties of a long wavelength infrared material comprises the steps of providing a layer of diffusible material over a surface of a long wavelength infrared material and heating said material to cause said transition metal layer to diffuse throughout the long wavelength infrared material. The diffusion step occurs over a period of time sufficient to permit said material to diffuse throughout the body. The method further comprises the step of removing any undiffused portions of the transition metal layer leaving said body having improved optical properties. With such an arrangement by diffusing transition metals for a long period of time into the material of the optical layer, improvement in optical characteristics for the material are provided. Since the treatment occurs at an elevated temperature without an elevated isostatic pressure, there is negligible grain growth in the LWIR material. Accordingly, improvement in optical properties are provided to the material without a corresponding weakening in the mechanical properties of the material.

In accordance with a further aspect of the present invention, a method of improving the optical properties of zinc sulfide comprising the steps of providing a layer of a metal selected from the group consisting of cobalt, iron, gallium, manganese, nickel, and vanadium over a surface of the zinc sulfide material. The method further comprises the step of heating said zinc sulfide material a period of time greater than about 48 hours to cause the selected transition metal to diffuse into the zinc sulfide material and removing undiffused surface portions of the material to provide a body having improved optical properties. With such an arrangement, the optical transmittance of the zinc sulfide body in the visible portion of electromagnetic spectrum is improved without causing an concomitant reduction in the mechanical properties of the zinc sulfide material. Further, by diffusing the selected species for sufficient period of time to provide sufficient penetration throughout the body, the material will become substantially water clear and nearly colorless.

BRIEF DESCRIPTION OF THE DRAWINGS

The foregoing features of this invention, as well as the invention itself, may be more fully understood from the following detailed description of the drawings, in which.

DESCRIPTION OF THE PREFERRED EMBODIMENTS

Figure 1:
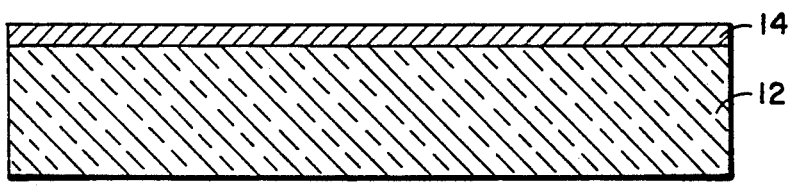
FIGS. 1-3 are a series of cross-sectional views showing steps in the fabrication of an optical element in accordance with the present invention.

Referring now to FIG. 1, a portion 10 of an optical element (not numbered) is shown to include a substrate 12 here comprised of an optical material which theoretically has transparency in the infrared and visible portions of the electromagnetic spectrum, generally characterized as a alkaline-earth halide and preferably is comprised of material selected from the group consisting of silicon, germanium, gallium arsenide, gallium phosphide, mercury cadmium telluride, zinc sulfide, zinc selenide, or one of the ternary sulfides such as calcium lanthanum sulfide. Preferably, here the material is selected from the group consisting of zinc sulfide and zinc selenide and, more preferably, the material is zinc sulfide. The base 12 has shown disposed over a surface thereof a layer 14 comprised of a diffusible material such as a metal and preferably a transition metal selected from the group consisting of cobalt (Co), iron (Fe), manganese (Mn), nickel (Ni), chromium (Cr), and vanadium (V) or a Group III metal such as gallium (Ga). The transition metal layer 14 is diffused into the substrate 12, as will be described in conjunction with FIG. 2.

Figure 2:
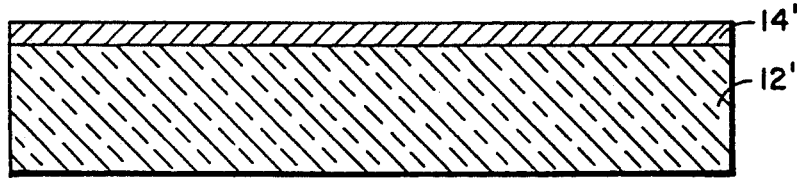
Figure 3:
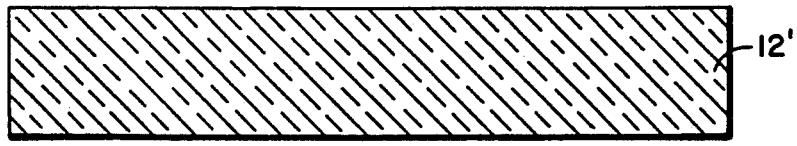

Referring now to FIG. 2, portions of layer 14 (FIG. 1) are shown diffused through substrate 12 (FIG. 1) providing residual transition metal layer 14' and doped substrate 12'. The diffusion technique, here used, is to heat the substrate and film to an elevated temperature in an inert atmosphere at a typically ambient pressure of argon. A typical heat treatment would be to heat the substrate and layer to a temperature in the range of 600° C. to 800° C. in flowing argon at the rate of one liter per minute for at least 24 hours preferably 48 hours and up to 120 hours or more depending upon the initial properties of the material, the degree of improvement desired in optical transparency, as well as the thickness of the sample.

After the heat treatment, the undiffused or remaining portion 14' of layer 14 (FIGS. 1 and 2) is removed and the surface previously having said layer is polished leaving behind substrate 12' having diffused therein as a dopant, diffusible material such as one of the transitional metals.

Figure 4:
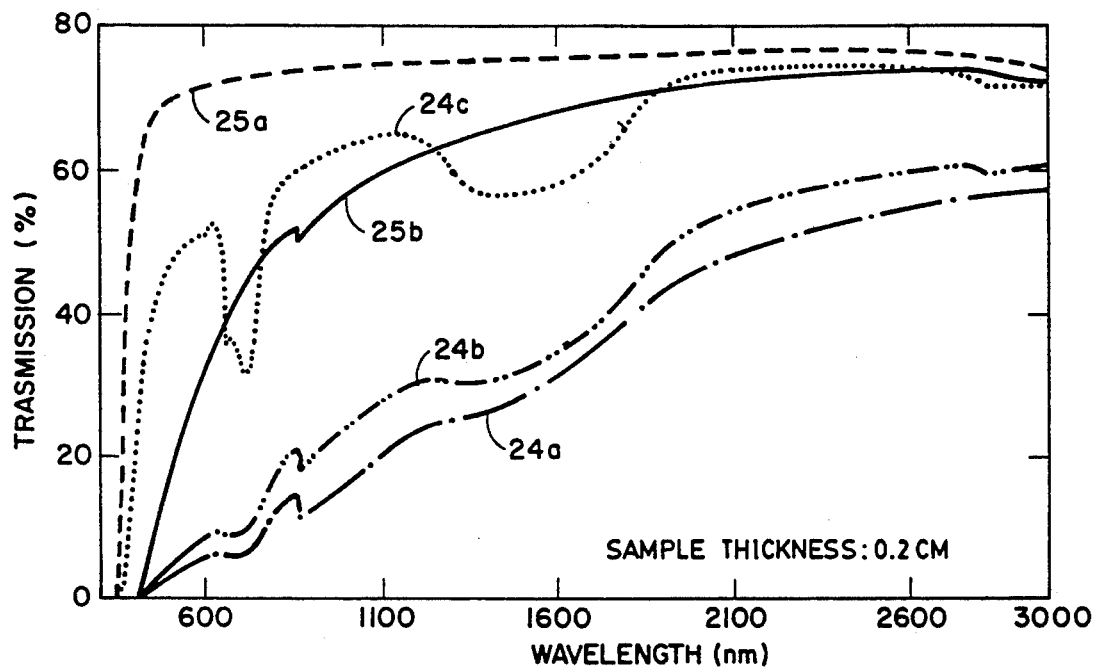
FIG. 4 is a plot of percent transmissivity vs. wavelength for optical elements in accordance with the present invention.
Figure 5:
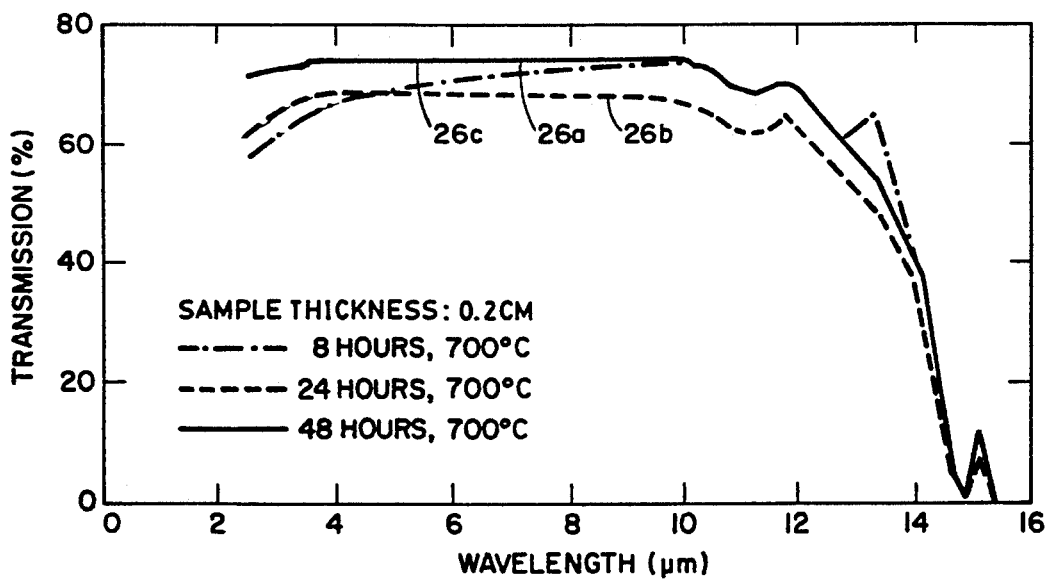
FIG. 5 is a plot of percent transmissivity vs. wavelength in the infrared range of 2.5$\mu$ to 14$\mu$ for the optical elements above mentioned.

Samples of standard grade zinc sulfide obtained from Raytheon Company, Waltham, Massachusetts were provided with a 3000 Å thick layer of cobalt. The cobalt was diffused into the material over three different time intervals at a temperature of 700° C. The material had a thickness of approximately 0.1 inches (0.2 cm). Percent transmission characteristics for the material are shown in FIGS. 4–6 with FIG. 4 showing the % transmission over the visible portion of the electromagnetic spectrum and over the near-infrared region for an 8 hour treatment (curve 24a) a 24 hour treatment (curve 24b), and a 48 hour treatment (curve 24c). These plots are also shown for comparison with plots of Multispectral ® Zinc Sulfide curve 25a and Raytran ® Standard Grade Zinc Sulfide curve 25b both from Raytheon Company, Waltham, Massachusetts. Note at 48 hours the % transmission in the visible becomes higher than standard grade. It is to be noted that the transmittance of the material increases substantially at longer durations of the heat treatment. Thus, longer treatments (i.e. 48 to 120 hours or more) should provide improved characteristics comparable to Multispectral ® ZnS but without applicable grain growth.

The % transmission of these samples over the 2.5μ to 14μ range are shown in FIG. 5. Again, the longer the treatment the higher the % transmission. Curve 26c was measured after a 48 hour treatment, curve 26b after a 24 hour treatment, and curve 26a after an 8 hour treatment. In particular, it should also be noted that the absorption band characteristic at 6 microns which is characteristic of standard grade chemically vapor deposited zinc sulfide is eliminated using this technique.

It should also be noted that for thicker samples of zinc sulfide material or any one of the other aforementioned long wavelength infrared materials, two coatings can be provided over opposite surfaces thereof and the diffusion treatment could occur from each one of said surfaces towards the center of the optical element. That is, since the time to diffuse a given depth of a material is related to the square of the thickness to be diffused, providing the material over a pair of surfaces of the element will significantly reduce the time required to diffuse such materials, particularly for thicker optical elements such as generally encountered in domes and optical windows. Such optical elements typically have thicknesses of 0.2 inches up to 0.5 inches and greater.

With the treatment described above, chemically vapor deposited ZnS, while normally has a strong yellow-orange tint, is changed in visible appearance to near water clear and colorless having a very slight bluish tinge.

The typical grain size of Multispectral ® Zinc Sulfide is approximately 350 microns whereas the grain size of the material as described above using cobalt as a dopant is 2–6 microns which is substantially the same as standard grade Raytran ® Zinc Sulfide which is 2–6 microns.

A treatment which improves mechanical properties of alkaline-earth halides is described in a copending application Ser. No. 614,187, filed Nov. 14, 1990 by J. Wahl, et al., now abandoned, assigned to the assignee of the present invention entitled "Method for Enhancing Mechanical Properties of Long Wavelength Infrared Material and Bodies Thereof."

Having described preferred embodiments of the invention, it will now become apparent to one of skill in the art that other embodiments incorporating their concepts may be used. It is felt, therefore, that these embodiments should not be limited to disclosed embodiments, but rather should be limited only by the spirit and scope of the appended claims.

What is claimed is:

1. A method of improving the optical properties of chemically vapor deposited zinc sulfide material comprises the steps of:
   providing a layer of a cobalt over a surface of the chemically vapor deposited zinc sulfide material;
   heating said zinc sulfide material and layer of cobalt for a period of time to cause portions of said cobalt to diffuse through said zinc sulfide material; and
   removing any undiffused portions of said layer of cobalt leaving a body having the improved optical properties.

2. A method of improving the optical properties of chemically vapor deposited zinc sulfide comprises the steps of:
   providing a layer of a transition metal over a surface of the zinc sulfide;
   heating said zinc sulfide and transition metal over a period of time greater than about 48 hours at a temperature in the range of about 600° C. to 800° C. to cause portions of said transition metal layer to diffuse throughout said zinc sulfide; and
   removing any undiffused portions of said transition metal layer from said zinc sulfide wherein said metal is cobalt.

3. The method of claim 2 wherein said diffusing step occurs at a temperature of about 700° C.

4. A body comprising essentially water clear, chemically vapor deposited zinc sulfide and cobalt disposed as a dopant throughout said zinc sulfide.

5. A body comprising chemically vapor deposited zinc sulfide material and a material of Co disposed as a dopant throughout said zinc sulfide material.

6. A body comprised of chemically vapor deposited zinc sulfide having cobalt dispersed throughout said body.

7. The body of claim 6 wherein said nearly colorless characteristic of said body is further characterized as having a very slight blue tinge.

8. The body of claim 6 wherein said grain size is in the range of 2-6 microns.

9. The body of claim 6 further comprising a dopant interdisposed in the zinc sulfide body.

10. The body of claim 6 wherein said body has a percent transmission of at least about 30% for wavelengths in the range of 600 nanometers to 1200 nanometers for a sample of said body having a thickness of 0.1 inches.

11. A body comprised of chemically vapor deposited zinc sulfide and cobalt dispersed throughout said body, such body having a grain size substantially less than 350 microns and being substantially water clear and nearly colorless having a very slight bluish tinge.

12. The body of claim 11 wherein said grain size is in the range of 2-6 microns.

13. The body of claim 12 wherein said body has a percent transmission of at least about 30% for wavelengths in the range of 600 nanometers to 1200 nanometers for a sample of said body having a thickness of 0.1 inches.

* * * * *